United States Patent [19]
Natale

[11] Patent Number: 4,726,825
[45] Date of Patent: * Feb. 23, 1988

[54] DISPOSABLE HEPA FILTRATION DEVICE

[75] Inventor: Anthony Natale, Maple Shade, N.J.

[73] Assignee: GPAC, Inc., Cinnaminson, N.J.

[*] Notice: The portion of the term of this patent subsequent to Sep. 23, 2003 has been disclaimed.

[21] Appl. No.: 909,900

[22] Filed: Sep. 22, 1986

Related U.S. Application Data

[63] Continuation-in-part of Ser. No. 704,508, Feb. 22, 1985, Pat. No. 4,613,348.

[51] Int. Cl.⁴ ............................................. B01D 46/02
[52] U.S. Cl. ................................... 55/318; 55/350; 55/467; 55/508; 55/519; 55/DIG. 3; 55/420
[58] Field of Search .................................. 55/318-320, 55/467, 472, 482, 485, 492, 493, 498, 500, 508, 518, 519, 350, DIG. 3; 15/347, 353

[56] References Cited

U.S. PATENT DOCUMENTS

| | | | |
|---|---|---|---|
| 3,032,954 | 5/1962 | Racklyeft | 55/472 |
| 3,103,426 | 9/1963 | Lantz | 55/420 |
| 3,508,383 | 4/1970 | Humbert et al. | 55/498 X |
| 3,605,786 | 9/1971 | Machin | 55/DIG. 3 X |
| 3,616,624 | 11/1971 | Marsh | 55/472 |
| 3,775,951 | 12/1973 | Eicholz et al. | 55/498 X |
| 3,928,008 | 12/1965 | Petersen | 55/472 |
| 4,072,483 | 2/1978 | Doyle | 55/372 |
| 4,118,208 | 10/1978 | Klinedinst | 55/472 |
| 4,175,934 | 11/1979 | Lang et al. | 55/482 |
| 4,229,193 | 10/1980 | Miller | 55/318 |
| 4,278,454 | 7/1981 | Nemesi | 55/492 X |
| 4,294,595 | 10/1981 | Bowerman | 55/213 |
| 4,333,745 | 6/1982 | Zeanwick | 55/485 |
| 4,486,206 | 12/1984 | Miyakawa et al. | 55/498 X |
| 4,543,112 | 9/1985 | Ackley et al. | 55/420 |
| 4,559,067 | 12/1985 | Durston | 55/324 |
| 4,613,348 | 9/1986 | Natale | 55/318 |

FOREIGN PATENT DOCUMENTS 2643067  3/1978  Fed. Rep. of Germany.

OTHER PUBLICATIONS

"Astrocel", American Air Filter, CAD1-110-E, Jul. 1984.

Primary Examiner—Charles Hart
Attorney, Agent, or Firm—Fleit, Jacobson, Cohn & Price

[57] ABSTRACT

A sealed filtration cannister including a filtration mechanism sealed within the cannister. A prefilter and a HEPA filter entrap asbestos-containing dust within the sealed cannister. Upon usage of the filtration cannister for a predetermined number of hours, the cannister is disposed of in its entirety. The cannister is used in conjunction with a separate vacuum cleaner device having a suction hose communicating with a cannister lid removably mounted on top of the cannister. Alternatively, the cannister is used with a portable vacuum motor assembly removably mounted on top of the cannister to provide independent suction to the filtration cannister.

21 Claims, 7 Drawing Figures

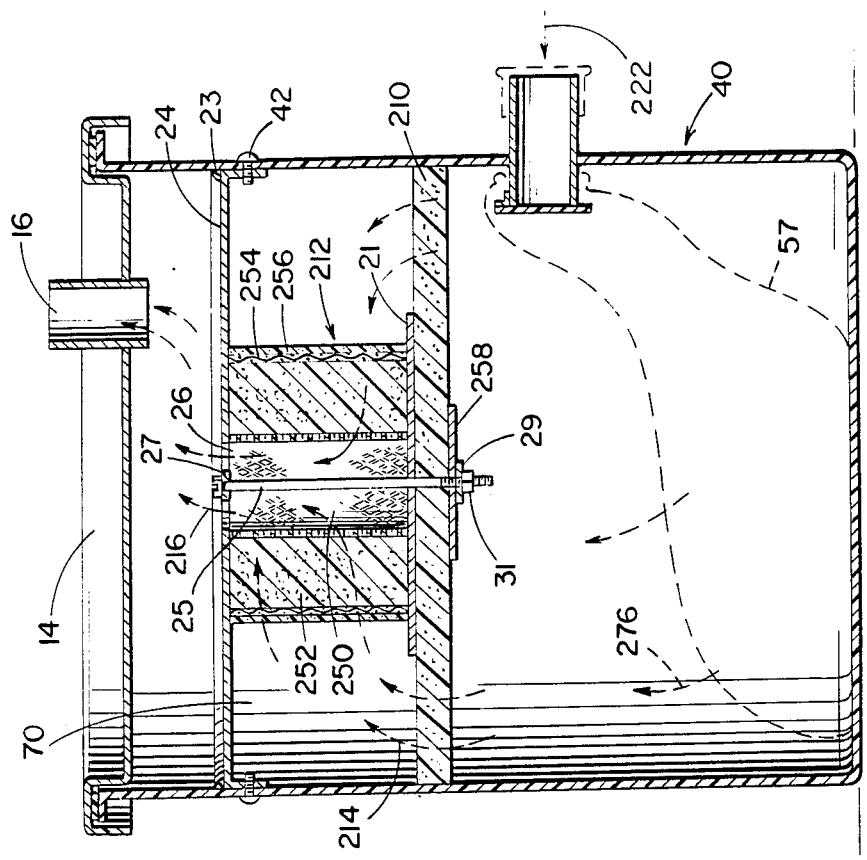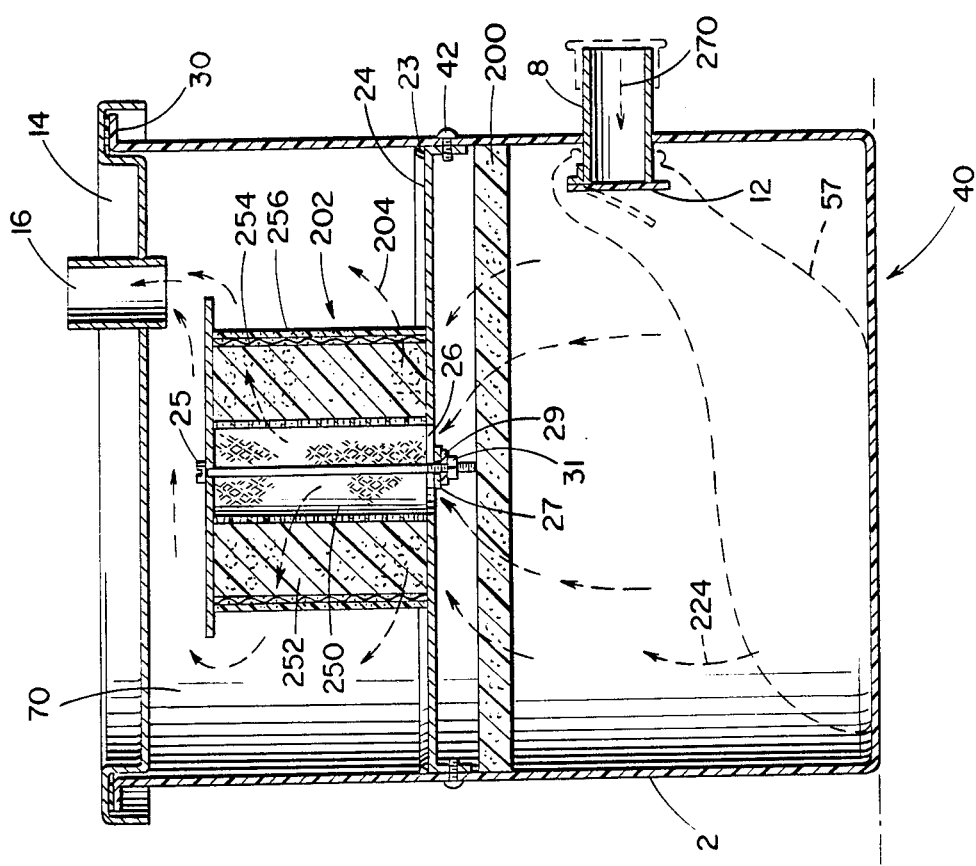

DISPOSABLE HEPA FILTRATION DEVICE

This application is a Continuation-In-Part of patent application Ser. No. 704,508, which was filed on Feb. 22, 1985 U.S. Pat. No. 4,613,348.

BACKGROUND OF THE INVENTION

Asbestos has traditionally been used as a heat insulating, fireproof material. Prior to the recent concern about the health hazards involved with the use of asbestos, asbestos was extensively used in all fields of construction. With the recent public awareness of the detrimental effects of the exposure to asbestos fibers found in airborne dust and the like, many clean-up campaigns have been undertaken to eliminate asbestos and asbestos-containing dust from public places. Asbestos-containing dust has therefore now become a major health concern.

Asbestos-containing dust is generated during the removal of asbestos, routine building renovations and building maintenance. Asbestos-containing materials have been found to regularly sluff off from pipe and boiler covering materials, ceiling coverings, and insulation. Particular attention has now been given to this problem in schools and other public buildings where accumulations of asbestos-containing dust is commonly found in corridors, rooms and maintenance areas.

The clean up of asbestos-containing dust is a problem unto itself. The fine asbestos particles found in asbestos-containing dust present asbestos in its most dangerous form. Asbestos fibers in dust easily take flight on air currents and can readily circulate throughout an entire air circulation system of a building. The levels of contamination, though invisible to the human eye, are often as high as those levels of contamination which have been documented to cause significant percentages of cancer in exposed populations.

Discussion of the Prior Art

Present practice for the removal of asbestos-containing dust includes the use of industrial machines for the removal of toxic dust. These machines are large, heavy-duty vacuum cleaners, specially designed for this purpose. The vacuum cleaners are equipped with special internal HEPA filtration systems. They operate by placement of a vacuum cleaner hose adjacent to asbestos-containing dust and create a vacuum to suck in dust through the hose. The air suction of the vacuum cleaner through the hose draws dust into the unit where large debris is trapped in coarse, disposable filter bags. Exhausted air is then forced through thick HEPA filtration material, which traps the sub-micron sized fibers. The air exiting the unit is clear of toxic material.

A serious unpublicized, but widely-recognized problem, associated with even sophisticated HEPA vacuum cleaners is that these machines must be emptied when they become full with asbestos-containing debris. The only method for emptying these machines is to open the machine, take out the bag of collected asbestos debris and dispose of the contaminated bag. This process creates substantial amounts of air borne contamination and is quite hazardous to the operator.

Another attempt to remove asbestos-containing dust includes the use of standard vacuum cleaners which are, in effect, asbestos recontamination machines since they contain no HEPA filter or other asbestos decontamination mechanism. Asbestos-containing dust is drawn into a non-HEPA filtered vacuum clearer, trapping the debris in a disposable debris bag. The air exhausted from the machine is filled with asbestos fibers and is circulated into the surrounding environment by the force of the exhausted air.

U.S. Pat. No. 4,072,483 to Doyle, Jr., discloses a vacuum cleaner employing a plurality of filters for picking up asbestos fibers. When it is desired to dispose of the asbestos fibers, the cover of the vacuum cleaner is removed and the filters are manually pulled from the tank, exposing the operator to asbestos contamination.

U.S. Pat. No. 4,229,193 to Miller, discloses a filter bag for a vacuum cleaner. The filter bag includes a primary filter bag, an impermeable shield and a secondary filter as a single unit. The filters are encapsulated within the impermeable shield. The area of the impermeable shield, which surrounds the opening into the primary filter bag, has an opening therethrough which is aligned with and is the same size as an opening of a container through which a hose connection with the container is made. The opening communicates through the impermeable shield and through the inlet of the primary filter bag, into the interior of the filter bag. To dispose of the filter bag, the bag must be removed from the vacuum cleaner.

SUMMARY OF THE INVENTION

The present invention includes a sealed disposable cannister containing a HEPA filtration mechanism which is inexpensive enough to justify its occasional use in public places, where from time to time, clean up of small quantities of asbestos-containing dust is required. Once full with asbestos containing dust, the entire sealed cannister including the HEPA filtration mechanism is disposed of following proper disposal procedures for asbestos, without recontamination of the surrounding environment or exposure of the operator to harmful asbestos fibers.

The cannister filtration device of the present invention can be used in conjunction with a standard vacuum cleaner or with a removable vacuum motor assembly. The sealed cannister includes an intake port having an inlet pipe extending therethrough with a hinged valve biased against the interior end of the inlet pipe and an exhaust port located adjacent to the top of the cannister. The interior of the sealed cannister contains a HEPA filter and a collection space for debris.

In one embodiment of the present invention, the intake hose of a standard vacuum cleaner is plugged into an opening defined by a cannister lid which is removably mounted on top of the cannister. A support plate defining the exhaust port is sealed within the cannister. The support plate spans across the interior of the cannister and is spaced from the cannister lid. The vacuum cleaner thus provides suction to the exhaust port of the sealed cannister.

A disposable, plastic hose is plugged into the intake pipe extending through the inlet port which is located on the side of the sealed cannister. Asbestos-containing dust and air are drawn into the sealed cannister through the open end of the disposable hose, and the sealed cannister acts as a filtering intermediary between the standard vacuum cleaner and asbestos-containing dust. The large particles of asbestos-containing debris are deposited, by gravity, in a debris collection area located at the bottom of the cannister or in a vacuum cleaner filter bag secured around the intake pipe.

The air drawn into the cannister, including fine dust and asbestos particles, continues to be sucked toward the exhaust port and is forced through a prefilter and radially outwardly or radially inwardly through approximately 6 inches of annular HEPA filter material. The HEPA filter material removes substantially all the asbestos fibers from the air.

The air is then drawn from the exhaust port of the support plate located adjacent to the HEPA filter or through the exhaust port and into the HEPA filter, and then exits from the sealed cannister through the opening of the cannister lid, free of asbestos contamination. The intake hose of the standard vacuum cleaner, connected to the opening of the cannister lid of the sealed cannister, thereby draws uncontaminated air from the exhaust port of the sealed cannister.

In a second embodiment of the present invention, a portable vacuum motor assembly fits on top of the cannister, instead of the cannister lid. In one form, it is removable from the cannister. The vacuum motor assembly creates suction on an air space located above the exhaust port. The support plate, defining the exhaust port, is sealed to the inside of the cannister. The vacuum motor assembly draws air into the cannister through the disposable vacuum hose connected to the inlet pipe and through the HEPA filtration mechanism. The uncontaminated air exiting through the exhaust port located adjacent to the HEPA filter is sucked out to the surrounding atmosphere by the vacuum motor assembly.

Once the total recommended hours of use of the sealed cannister is completed, the inlet pipe of the sealed cannister is plugged and a disposable cover secured to the top of the cannister to seal in all asbestos contamination. However, this is only an added precaution to trap the asbestos particles in the HEPA filter and to avoid migration of the particles to the surrounding environment. The inlet pipe is also sealed by the biased valve located at its interior end.

Therefore, all the asbestos contaminated material is effectively sealed within the cannister. The sealed cannister then functions as its own disposable unit, meeting all asbestos disposal requirements and avoiding the possibility of recontaminating the atmosphere or endangering the operator by exposure to asbestos during disposal.

It is an object of the present invention to overcome the disadvantages of the prior art and provide a disposable device for collecting asbestos containing dust.

It is another object of the present invention to effectively collect asbestos-containing dust without exposing the operator to asbestos during collection and disposal of the asbestos-containing dust.

It is yet another object of the present invention to seal asbestos-containing materials in a filtration cannister for disposal of the asbestos-containing material without exposing the operator to the asbestos-containing material during disposal.

It is still another object of the present invention to provide a filtration cannister, having an inlet port with an inlet pipe extending therethrough and an exhaust port, which are effectively sealed for protecting an operator and the surrounding environment from exposure to asbestos-containing materials during collection and disposal of asbestos-containing dust.

These and other objects of the invention, as well as many of the intended advantages thereof, will become more readily apparent when reference is made to the following description, taken in conjunction with the accompanying drawings.

BRIEF DESCRIPTION OF THE DRAWINGS

FIGS. 5 and 6 are sectional views of alternate embodiments of disposable cannisters.

DETAILED DESCRIPTION OF THE PREFERRED EMBODIMENTS

Figure 1:
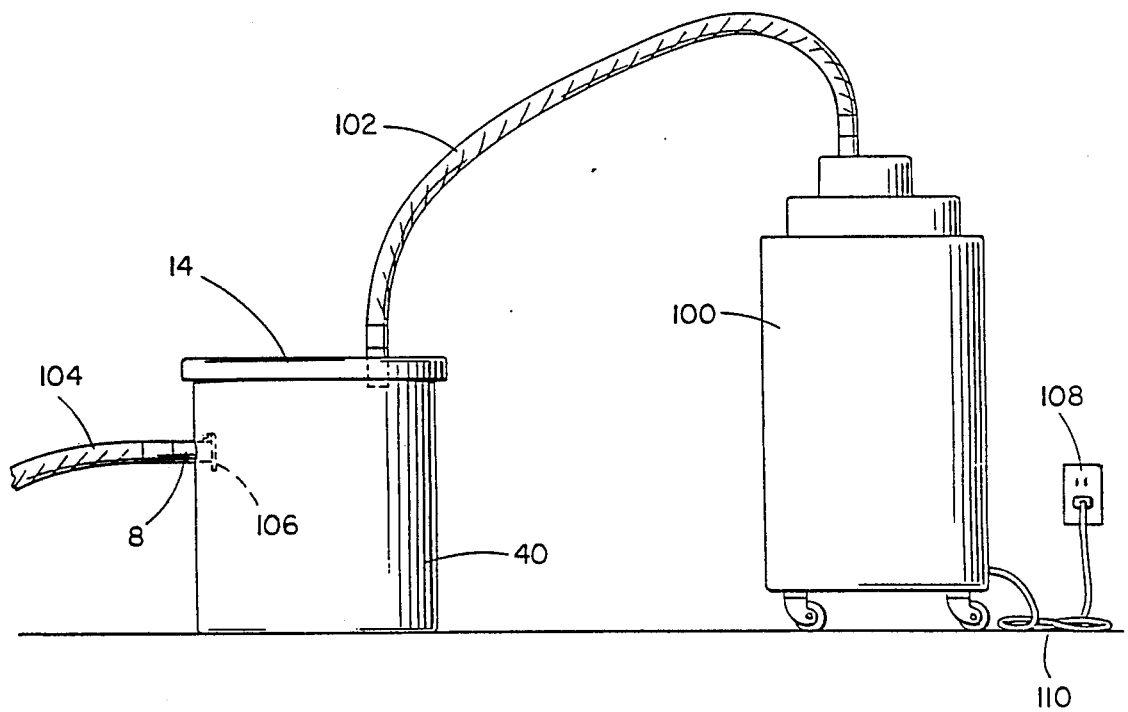
FIG. 1 illustrates a disposable vacuum hose connected to the sealed disposable cannister of the present invention, and a standard vacuum cleaner interconnected to create the vacuum power for the sealed cannister.

In describing preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

FIG. 1 illustrates the interconnection of sealed cannister 40 with vacuum cleaner apparatus 100. A vacuum hose 102 extends from the vacuum cleaner 100 to the cannister lid 14 which is located on top of the sealed cannister 40. End 106 of disposable vacuum hose 104 extends into the interior of the sealed cannister 40 through the inlet pipe 8. A power source 108 is connected to vacuum cleaner 100 by wire 110.

Asbestos-containing dust and air are sucked into sealed cannister 40 by vacuum hose 104. The asbestos-containing dust and air enter the sealed cannister 40 through the end 106 of vacuum hose 104. The asbestos-containing dust is filtered as it travels through the sealed cannister. Uncontaminated air exiting from the cannister 40 travels through vacuum hose 102 to the vacuum source, vacuum cleaner 100. The uncontaminated air is exhausted from the vacuum cleaner 100 into the surrounding environment.

Figure 2:
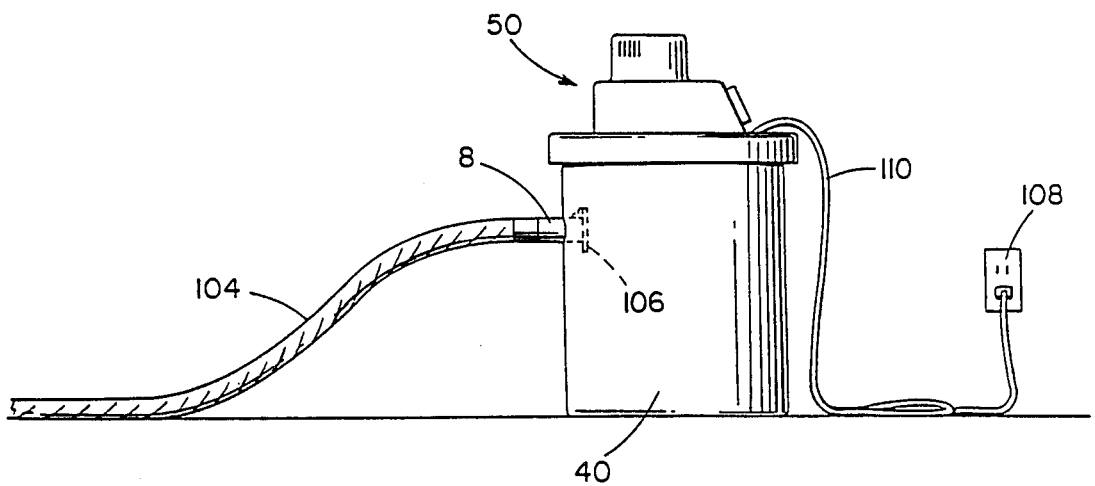
FIG. 2 illustrates a disposable vacuum hose connected to the sealed cannister of the present invention, and a vacuum motor assembly mounted on top of the sealed cannister for vacuum power.

In FIG. 2, end 106 of disposable vacuum hose 104 is inserted through inlet pipe 8 to project into the interior of the sealed cannister 40. A vacuum motor assembly 50 is located on top of the container 40 and is connected by a wire 110 to power source 108. Asbestos-containing dust and air are drawn through vacuum hose 104 into sealed cannister 40. Uncontaminated air is withdrawn from the top of the sealed cannister 40 by vacuum motor assembly 50. The uncontaminated air is exhausted from the vacuum motor assembly into the surrounding environment.

Figure 3:
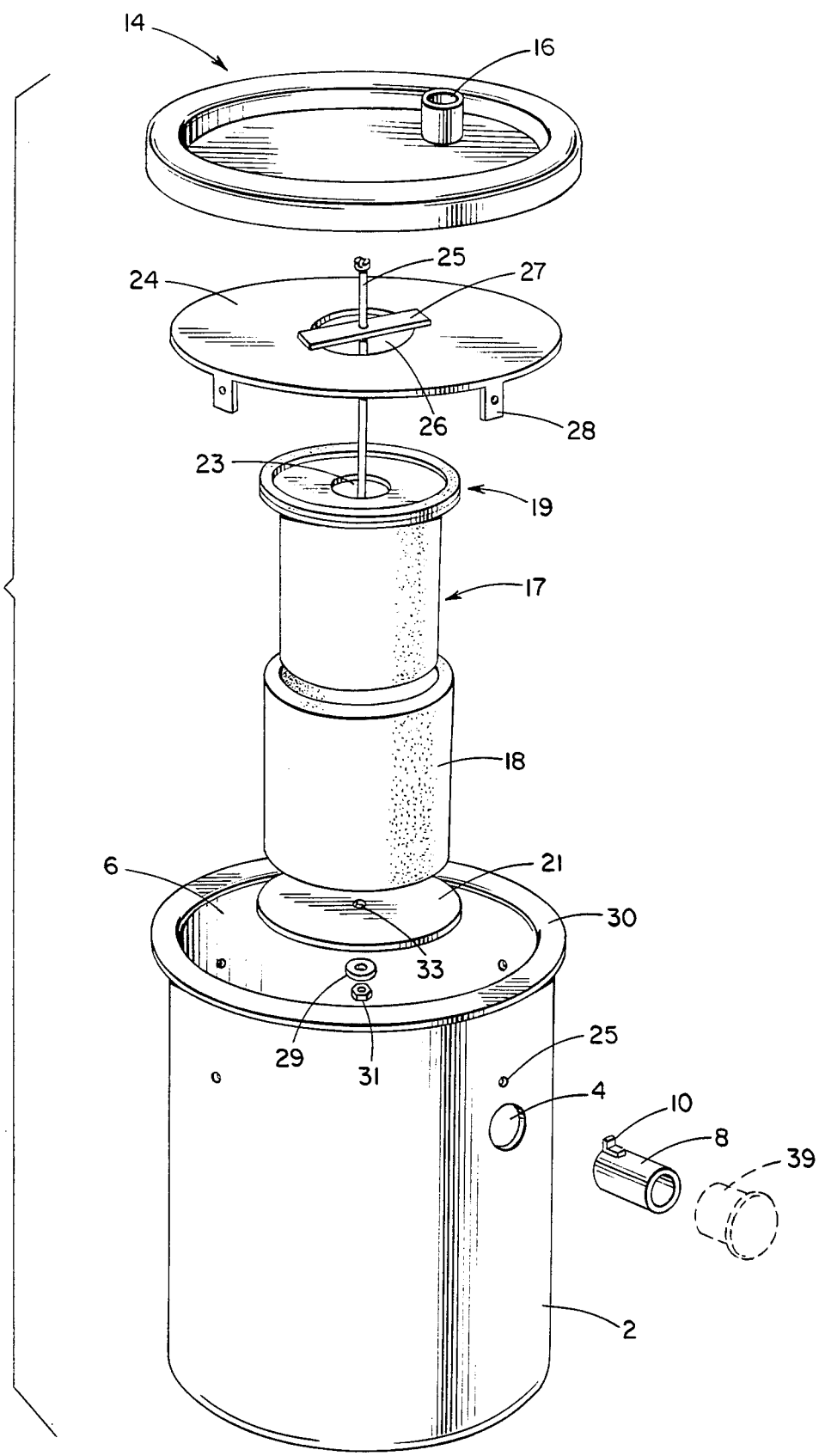
FIG. 3 is an exploded side view of the disposable cannister of the present invention with the removable lid for use with a separate vacuum cleaner, as shown in FIG. 1, including the elements which are to be sealed inside the cannister.

In FIG. 3, a cannister 2 is shown having a top open end 6 and a side inlet port 4. The cannister 2 is preferably a conventional drum made of rigid plastic material, such as polyethylene, polystyrene, polymethylmetacrylate, polyurethane, etc. having a capacity in the neighborhood of 5 to 55 gallons.

Figure 4:
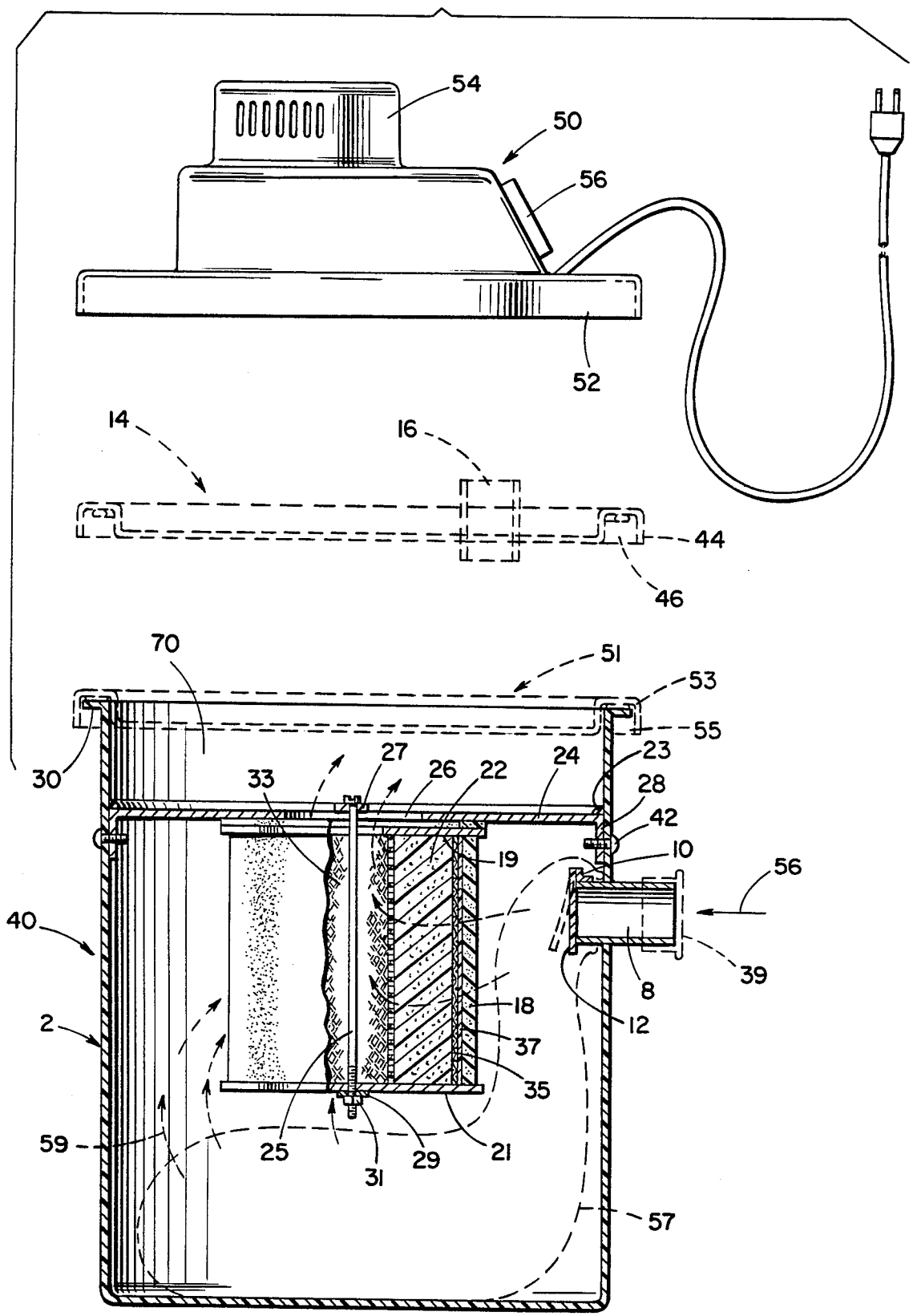
FIG. 4 is an exploded sectional side view of the present invention showing the sealed cannister having a disposal cover with an alternately usable cannister lid as shown in FIGS. 1 and 3 or a vacuum motor assembly as shown in FIG. 2.

An inlet pipe 8, shown spaced from the cannister 2 in FIG. 3, is normally positioned extending through inlet port 4, so that part of the inlet pipe 8 extends outwardly from the side of the cannister and part of the inlet pipe extends into the cannister, as shown in FIG. 4. Hinge 10 is located at the interior end of inlet pipe 8. Hinge 10 resiliently biases one end of a damper valve 12 against the interior end of pipe 8 to seal the pipe.

Sealing the top of the sealed cannister of the present invention is a support plate 24 which defines an exhaust port 26 centrally located in the plate. Projecting tabs 28 are spaced about the circumference of the support plate 24 and extend perpendicular to the top surface of the support plate. The support plate 24 is secured to the inside of the cannister 2 by screws, bolts or like fasteners (see bolts 42 in FIG. 4) which extend through holes 25 in the side of the cannister and seal these holes against the through flow of air. The fasteners extend through the tabs 28 to position the securing plate above the outlet port 4 and at a distance from the top edge 30 of the cannister 2. The support plate is sealed to the interior walls of the cannister by a fillet of silicone or other sealant interconnecting the support plate and side walls. The cannister lid 14 fits over the outer edge 30 of the top of the open end 6 of the cannister 2 to form an air space between the lid and the support plate 24.

Supported below the support plate 24 in the interior of the cannister 2, as by screws, glue or the like, is cylindrical main filter 17, having a central hollow portion. Annular prefilter 18, measuring approximately one-half to one inch thick, surrounds main filter 17 and filters particles of a size greater than 5 microns.

Prefilter 18 is held around main filter 17 between a circular top metal plate 19 and a circular bottom metal plate 21. Plate 19 includes a circular opening 23 which is below and aligned with exhaust port 26 when bolt 25 extends through anchoring plate 27, which extends across port 26, and is secured by a washer 29 and nut 31 after passing through hole 33 of plate 21. Bolt 25 draws plate 21 against main filter 17 and prefilter 18 to force them into sealing engagement with plate 19.

Housed within main filter 17 is annular HEPA filter 22. Filter 22 is a high efficiency particulate air (HEPA) filter which is 99.97% effective in filtering out particles of a size greater than 0.3 microns. Filter 22 makes up substantially all of the main filter 17, providing at least 6 inches of HEPA filter thickness through which the asbestos laden air must past. The filter 22 may include a pleated surface for increased surface area exposure to the asbestos-containing air and to provide less resistance to the flow of air through the filter.

The filter 22 is blocked off at its bottom by plate 21. Asbestos laden air is therefor forced in a radial direction through prefilter 18 into main filter 17. A hollow core of main filter 17 is in flow communication with exhaust port 26 for exiting of filtered air through opening 16 of cannister lid 14 which is placed over the top of the open end 6 of the cannister 2. The cannister lid is used in the embodiment shown in FIG. 1, where a vacuum cleaner 100, having a vacuum hose 102 extends from the vacuum cleaner to the opening 16 of cannister lid 14 of the filtration cannister 40.

In FIG. 4, the sealed filtration cannister 40 is shown in its assembled form with the alternative assembly forms: a removable lid 14 (for use with a standard vacuum cleaner) or a separate vacuum motor assembly 50 or a disposal cover 51. The support plate 24 is fixedly sealed to the inside wall of the cannister 2 at a distance from the open end 6 of the cannister 2. Projecting tabs 28 are secured to the inside wall of the cannister by bolts 42 extending from the outside of the cannister through the side wall. Main filter 17 is sealingly mounted to the support plate 24 so that the central hollow portion of the main filter 17 is aligned with and below the exhaust port 26 of the support plate. Sealingly engaging the bottom of the main filter 17 is plate 21. Prefilter 18 surrounds the entire exterior surface area of main filter 17.

Main filter 17 includes at its innermost surface an annular expanded metal liner 33. Liner 33 surrounds a central hollow core of the main filter 17, through which bolt 25 passes. Adjacent to the inner liner 33 is the HEPA filter 22 which may be of a known construction, preferably a pleated, fiber, paper-type filter or a polymeric plastic foam filter. The efficiency of the filter is 99.97% to 0.3 microns. Located radially outward from the HEPA filter 22 is a plastic (polypropylene) screen 35. Adjacent to screen 35, in a radially outward direction, is a closed foam cellulose media filter 37. Surrounding filter 37 is the prefilter 18.

Inlet pipe 8 projects through the inlet port located at the side of the cannister 2. Inlet damper valve 12 is secured to hinge 10 which is secured to the interior end of inlet pipe 8. Inlet damper valve 12 is biased to sealingly engage the interior end of the inlet pipe 8. Hinge 10 is biased to force the damper valve 12 against the inlet pipe 8 to form a seal. Hinge 10 and damper valve 12 form, in one embodiment, a check valve, made of flexible plastic. The pipe 8 may be covered by cap 39, shown in dotted lines, to form an airtight seal during storage of the filtration cannister 40 and during disposal of the filtration cannister.

Vacuum filter bag 57 is secured around inlet pipe 8 and extends from the inlet pipe to a bottom area within cannister 2. Air drawn in through inlet pipe 8 carrying asbestos-containing particles traps the larger particles within bag 57. Particles too small to be trapped within bag 57 pass through the bag in the direction of arrows 59 and continue on to be filtered by prefilter 18 and main filter 17.

The support plate 24 is sealed to the interior wall of the cannister by a silicone fillet 23 extending from the edge of the support plate to the interior wall of the cannister. The support plate thus forms an airtight seal with the cannister to prevent air from traveling from the interior of the cannister which is defined by the bottom and side walls of the cannister and the support plate. Air enters the cannister only through inlet pipe 8 and exits only through exhaust port 26 after passing radially inwardly through the main filter 17.

Disposal cover 51 is shown in dotted lines sealingly mounted on top of filtration cannister 40. Cover 51 is used during storage and disposal of the filtration cannister. Compressed sealing O-ring is located between the cannister and the U-shaped flange 55 of the cover 51. Cover 51 is held by clamps or other suitable holding devices.

Removable cannister lid 14 is shown in dotted lines in FIG. 4 positioned above the cannister 2. U-shaped flange 44 includes a sealing O-ring 46 which engages the flange 44 and top edge 30 of the cannister 2 when the cannister lid 14 is removably held onto the open end 6 of the cannister 2. The lid is held by clamps or other suitable holding devices (not shown).

The opening 16 in the cannister lid 14 is spaced vertically to the side from exhaust port 26 in order to prevent damage, which might be caused by a vacuum hose inserted too far into opening 16. This space also provides an air space 70 located above exhaust port 26 in which the vacuum power source can create the necessary vacuum in the sealed unit in advance of the filters.

The cannister lid 14 can be removably used in conjunction with the sealed filtration cannister 40 in one embodiment of the present invention. Alternatively, the lid 14 can be rigidly secured to the top of cannister 2. As so constructed the decontamination unit would be used in the FIG. 1 embodiment and the integral lid disposed of with the unit.

Shown in FIG. 4 is vacuum motor assembly 50 including support member 52, motor housing 54 and exhaust opening 56. The vacuum motor assembly 50 is used, in conjunction with the sealed filtration device 40, as an alternate embodiment of the present invention from that embodiment using the cannister lid 14. The vacuum motor assembly 50 is removably held on the top edge 30 of the cannister 2 by clamps or other suitable holding devices (not shown) for creating suction of air from the exhaust port 26.

The vacuum motor assembly 50 is interchangeable with the cannister lid 14 for sealing the air space 70 defined above the support plate 24. When the cannister lid 14 is used, as shown in FIG. 1, a vacuum cleaner 100 is used in conjunction with the sealed filtration cannister 40. The inlet vacuum hose 102 of the vacuum cleaner 100 is placed within opening 16 of the cannister lid 14. The cannister lid is removably held onto the cannister. Upon actuation of the vacuum cleaner, suction is created on the air space 70, exhaust port 26, main filter 17, prefilter 18 and inlet pipe 8.

In the alternate embodiment shown in FIG. 2, the vacuum motor assembly 50 is removably held on the top edge 30 of the cannister 2. The vacuum motor assembly creates suction on air space 70, exhaust port 26, filter 22, prefilter 18 and inlet pipe 8. Air is exhausted through opening 56 to the atmosphere.

In FIGS. 5 and 6, alternate arrangements for the filtering media are shown. In FIG. 5, rigid foam prefilter 200 extends across the width of the cannister 2 and is spaced a distance, preferably at least one inch, below support plate 24. Main filter 202 is mounted above the support plate 24, so that exhaust port 26 is aligned with a central hollow portion of main filter 202. Main filter 202, similar to main filter 17 in FIG. 4, includes an expanded metal liner 250, a HEPA filter 252, a plastic screen 254 and foam filter 256 arranged in a radial outward progessive order. However, in FIG. 5, prefilter 200 is located below the main filter 202. The flow of air through the inlet pipe 8, past biased valve 12 and through optional filter bag 27, then passes through prefilter 200. All of the prefiltered air then passes into exhaust port 26 and travels radially outwardly from the center of the main filter 202 in the direction of arrows 204. Once the air has passed radially through the filter 202 the filtered air is allowed to be sucked out through exhaust opening 16. If desired, the fan blower top 50 shown in FIG. 4 or the disposal cover 51 may be mounted on the top 30 of the cannister 2 shown in FIG. 5.

In FIG. 6, rigid foam prefilter 210 is mounted below and in contact with plate 21, so that air entering through inlet pipe 8 is first filtered through prefilter 210 and then passes to the sides of circular plate 21 so as to enter main filter 212. Bolt 25 passes through plate 27, spanning exhaust port 26, passing through plate 21 at the bottom of filter 212 and passing through support plate 258 located on the opposite side of prefilter 210 from plate 21. Washer 29 and nut 31 are secured to bolt 25 to seal the assembly of plate 258, prefilter 210, plate 21, filter 212 and plate 24.

Air passes radially inwardly through the main filter to 212 until reaching a central hollow portion of the filter 212 located below and in alignment with exhaust port 26 of support plate 24. Air passes in the direction of arrows 214 through prefilter 210 and radially through main filter 212 to exit in the direction of arrows 216 through opening 16 of lid 14.

Main filter 212 includes expanded metal liner 250, HEPA filter 252, plastic screen 254 and foam filter 256. These elements are arranged as in FIGS. 4 and 5; however, in FIG. 6, air flow passes radially inwardly through filter 212. Vacuum motor assembly 50 may also be used with the sealed cannisters of FIG. 6.

Figure 7:
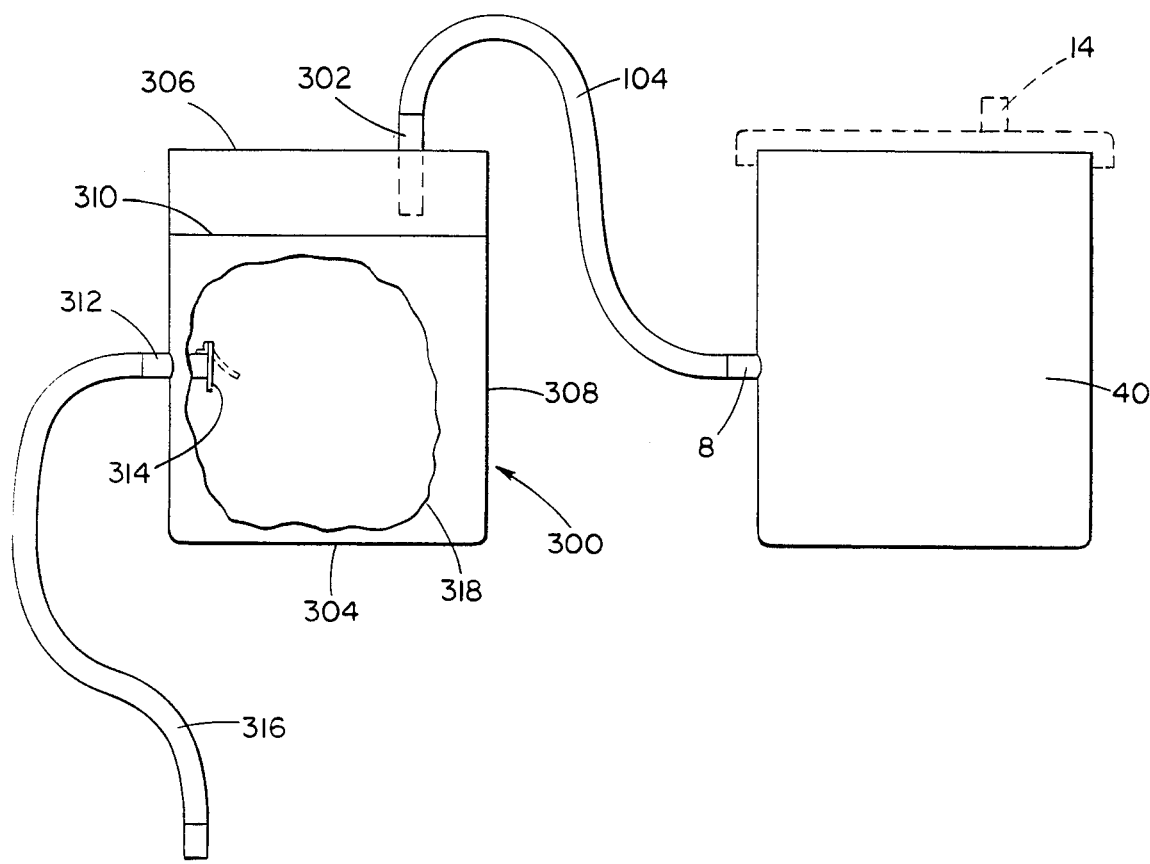
FIG. 7 is a diagramatic view of a sealed prefilter cannister connected to a sealed cannister.

In FIG. 7, sealed cannister 40 is shown which is similar to the sealed cannisters shown in FIGS. 1, 2, 4, 5 and 6. Canister lid 14 is shown in dotted lines and it is contemplated that vacuum motor assembly 50, as shown in FIG. 2, can be substituted for cannister lid 14. In either event, a suction force is created at inlet pipe 8 of sealed cannister 40. As in FIGS. 1 and 2, vacuum hose 104 is connected at one end to inlet pipe 8. However, in the FIG. 7 embodiment, the other end of vacuum hose 104 is connected to an outlet pipe 302 of a second sealed cannister 300.

Sealed cannister 300 includes bottom wall 304 and top wall 306 through which outlet pipe 302 passes. Bottom wall 304 is sealed with cylindrical side wall 308 which is sealed to top wall 306. Bottom wall 304, top wall 306 and side wall 308 form a sealed cannister. A screen 310 is located spanning the sealed cannister 300, extending across side wall 308. Screen 310 preferably includes 1 inch×1 inch openings.

Inlet pipe 312 includes a damper valve 314 similar to inlet pipe 8 and damper valve 12 of sealed cannister 40. A disposable vacuum hose 316 extends through inlet pipe 312 to the interior of the sealed cannister 300. A filter bag 318 is secured to the interior end of inlet pipe 312 and, as shown in the inflated state, occupies a substantial portion of the interior space of sealed cannister 300 below screen 310. The filter bag 318 is capable of entrapping particles greater than 10 microns in size.

Upon introduction of a suction force to the top of sealed cannister 40, as shown in FIG. 1 with a vacuum cleaner 100 or as in FIG. 2 with a vacuum motor assembly 50, a suction force is created at inlet pipe 8. The suction force is transferred through vacuum hose 104 to outlet pipe 302 of sealed cannister 300. The suction force at inlet pipe 302 creates a suction force on the open end of vacuum hose 316. Suction is communicated through vacuum hose 316, through inlet pipe 312, and into filter bag 318. Filter bag 318 expands by the suction force to occupy the interior of sealed cannister 300 located below the screen 310. Screen 310 keeps the filter bag away from inlet pipe 302 so inlet pipe 302 is not blocked by the filter bag 318.

The filter bag 318 traps 95% to 98% of the particles which are sucked in by vacuum hose 316. Therefore, only particles less than 10 microns in size are transferred through vacuum hose 104 to sealed cannister 40. By this arrangement, the larger particulate can be collected and disposed of separately from the smaller particles. Normally, the larger particulate accumulates much more rapidly than the HEPA filter tends to clog, and this arrangement allows for disposal of the larger filter particulate without having to replace an entire unit. Once filled, the sealed prefilter cannister 300 is disconnected from vacuum hose 104, capped and disposed of according to proper asbestos disposal requirements after a predetermined amount of use. A new prefilter can then be connected.

In the operation of the present invention, as shown in FIGS. 1 and 3 through 6, a disposable vacuum hose 104 used to pick up asbestos-containing dust is inserted into inlet pipe 8 such that one end 106 of the vacuum hose 104, shown in phantom, pushes open the inlet damper valve 12 and the disposable vacuum hose 104 communicates with the inside of the sealed filtration device 40. When the vacuum cleaner 100 communicating with the opening 16 or vacuum motor assembly 50 is activated, air is drawn in through the disposable vacuum hose 104, as indicated by arrow 56 in FIG. 4, 220 in FIG. 5 and 222 in FIG. 6. Air, including asbestos-containing dust, travels through inlet pipe 8, past the inlet damper valve 12 which has been forced open by the insertion of the disposable vacuum hose 104. The air entering past damper valve 12, and optionally in each embodiment encounters filter bag 57, and is filtered. Large particles of dust and asbestos settle to the bottom of the filter bag 57. The air and fine particles of asbestos, as shown by arrows 59 in FIG. 4, 224 in FIG. 5, and 226 in FIG. 6, continue on their path toward the suction source located above exhaust port 26.

The asbestos-containing air passes through prefilter 18 in FIG. 4, prefilter 200 in FIG. 5, and prefilter 210 in FIG. 6, where asbestos particles and fibers of greater than 5 microns in size are screened. Those particles less than 5 microns in size continue up into main filter 17 in FIG. 4, main filter 202 in FIG. 5 and main filter 212 in FIG. 6. In the HEPA filters, particles of asbestos of greater than 0.3 microns are screened with 99.97% efficiency. The filtered non-contaminated air exits into air space 70. The air is then drawn through opening 16 of cannister lid 14 which is connected by a vacuum hose 102 to a vacuum cleaner 100, or in the case where the vacuum motor assembly 50 is mounted on top of the cannister 2, the air is exhausted through outlet 56. In either event, asbestos free air is drawn from the exhaust port 26 of the sealed filtration cannister.

When the sealed filtration cannister 40 has been used for a predetermined amount of use, the disposable vacuum hose 104 is removed from inlet pipe 8. The cannister is then sealed by disposal cover 51 and cap 39. The filtration cannister may be disposed of in its entirety, and the solid particles and fine particles entrapped in the cannister, filter bag, prefilter and HEPA filter are disposed of with the sealed cannister. During disposal of the cannister, there is no exposure of asbestos to the operator. All of the collected asbestos particles are trapped within the sealed cannister 40.

The disposable filtration cannister of the present invention is relatively inexpensive and therefore is highly efficient for the cleaning up of asbestos-containing dust, without requiring the purchase of an expensive, specially designed vacuum cleaning apparatus. The operator of the present invention is also guarded against recontaminating the atmosphere with asbestos fibers during use of the sealed filtration cannister and is protected from exposure to asbestos fibers during disposal of the sealed filtration cannister.

Although the present invention has been described in connection with preferred embodiments, many variations and modifications will now become apparent to those skilled in the art. It is preferred, therefore that the present invention be limited not by the specific disclosures herein but only by the appended claims.

I claim:

1. A filter device for filtering asbestos contaminated air sucked through said device comprising:
   a sealed cannister having a top, bottom, and sides for entrapment of asbestos fibers therein,
   said sealed cannister being adapted to be disposed of after collection of asbestos fibers,
   filter means including a HEPA filter and prefilter, said filter means being supported by said sealed cannister,
   an inlet to the interior of the cannister located upstream from said prefilter whereby air, sucked into the sealed cannister is first filtered by said prefilter and then filtered by said HEPA filter,
   outlet means defined in said top for the sole egress of air from said sealed cannister and being in sealed air flow communication with said filter means to ensure filtration of all air exiting said cannister, and
   cover means mounted on said cannister and spaced above said top to define an air space between said top and said cover means within which suction is created on said filter means.

2. A filter device as in claim 1, wherein said filter means is mounted on said top, between said top and said bottom of said sealed cannister.

3. A filter device as in claim 2, wherein said prefilter is an annular filter surrounding said HEPA filter.

4. A filter device as in claim 2, wherein said prefilter is a rigid prefilter extending between said sides of said sealed cannister.

5. A filter device as in claim 1, wherein said filter means is mounted on said top, between said top and said cover means.

6. A filter device as in claim 4, wherein said prefilter is a rigid filter extending between said sides of said sealed cannister.

7. A sealed disposable filtration device for filtering asbestos contaminated air sucked through said device comprising:
   a sealed cannister having a top, bottom, and side walls,
   inlet means to said cannister,
   exit means defined in said top for the sole egress of air from said sealed cannister,
   HEPA filter means secured in said cannister between said top and said bottom and surrounding said exit means whereby air sucked through said inlet means and exhausted through said exit means must pass through said HEPA filter means and substantially all asbestos contamination will be entrapped in said sealed cannister, whereby said sealed cannister may be adapted to be disposed of after a predetermined amount of use, and
   cover means being mounted on said cannister and spaced above said top to define an air space between said top and said cover means within which suction is created on said filter means.

8. A disposable cannister as in claim 7, wherein a filter bag is located in siad cannister and secured to said inlet means for air flow trhough said inlet means and through said filter bag.

9. A disposable cannister as in claim 7, wherein an annular prefilter surrounds said HEPA filter means, 10. A disposable cannister as in claim 7, wherein a prefilter extends across said sealed cannister, upstream from said inlet means, and filters all air passing through said inlet means prior to the air reaching said HEPA filter, means.

11. A disposable cannister as in claim 9, wherein said HEPA filter means includes an annular filter assembly having a hollow central portion open at one end, said one end is in flow communication with said exit means so that air passes radially inwardly through said annular filter assembly.

12. A sealed disposable filtration device for filtering asbestos contaminated air sucked through said device comprising:
a sealed cannister having a top, bottom, and side walls,
inlet means to said cannister,
exit means defined in said top for the sole egress of air from said sealed cannister,
HEPA filter means mounted above said top and in sealed communication with said exit means whereby air sucked through said inlet means and through said exit means must pass through saisd HEPA filter means and whereby said sealed cannister may be adapted to be disposed of after a predetermined amount of use, and
cover means being mounted on said cannister and spaced above said top to define an air space located between said top and said cover means within which suction is created on said filter means.

13. A disposable cannister as in claim 12, wherein a prefilter extends across said sealed cannister, upstream from said inlet means, and filters all air passing through said inlet means prior to the air reaching said HEPA filter means.

14. A disposable cannister as in claim 13, wherein said HEPA filter means includes an annular filter assembly having a hollow central portion open at one end, said one end is in flow communication with said exit means so that air passes radially outwardly through said annular filter assembly.

15. A disposable cannister as in claim 12, wherein said HEPA filter means is mounted between said top and said cover means.

16. A disposable cannister as in claim 12, wherein a filter bag is located in said cannister and secured to said inlet means for air flow through said inlet means and through said filter bag.

17. A filter system for filtering asbestos contaminated air sucked through said system comprising:
first and second separately sealed cannisters having separate air flow paths therethrough, each of said sealed cannisters having an inlet and an outlet and a top, bottom, and sides, and each of said two sealed cannisters being adapted to be disposed of after a predetermined amount of use,
filter means supported within each of said two sealed cannisters, said second sealed cannister having a finer filtering media than the first sealed cannister,
said inlet to the interior of said second sealed cannister being located upstream from its filtering media,
said outlet of said second sealed cannister being defined in its top and being in sealed air flow communication with its filter means to ensure filtration of all air exiting said second sealed cannister,
cover means mounted on said second sealed cannister and spaced above its top to define an air space between its top and said cover means within which suction is created on its filter means, and
air flow communication means extending between said inlet of said second sealed cannister and said outlet of said first sealed cannister for providing sealed air flow between said two sealed cannisters so that when a suction force is applied to said outlet of said second sealed cannister, air is drawn into said inlet of said first sealed cannister and filtered in said first sealed cannister prior to passing through said air flow communication means and being filtered in said second sealed cannister and sucked out said outlet of said second sealed cannister.

18. A filter system as in claim 17, wherein said second sealed cannister includes a HEPA filter.

19. A disposable filtration device for collecting asbestos particulate and filtering sbestos contaminated air sucked through said device comprising:
an open top container,
a sealed compartment located in said container spaced below a top edge of said container for receiving asbestos particulate and having a prefilter therein,
an inlet to the interior of said sealed compartment whereby asbestos particulate can be sucked into said compartment for collection therein,
a filter means including a HEPA filter supported within said sealed compartment whereby air sucked into the sealed compartment is first filterd by said prefilter and then filtered by said HEPA filter,
outlet means in air flow communication with said sealed compartment and said filter means whereby air sucked into said sealed compartment must pass in sequence first through said prefilter, then through said filter means, and finally through said outlet means, and
cover means being mounted on said container to define an air space between said sealed compartment and said cover means within which suction is created on said filter means.

20. A device as in claim 19, wherein said sealed compartment is located in a first cannister and said filter means is located in a second cannister, separate from said first cannister.

21. A device as in claim 19, wherein said sealed compartment and said filter means are located in a single cannister.

* * * * *